US008660733B2

(12) United States Patent
Tashiro et al.

(10) Patent No.: US 8,660,733 B2
(45) Date of Patent: Feb. 25, 2014

(54) CONTROL DEVICE FOR HYBRID VEHICLE

(71) Applicant: Denso Corporation, Kariya (JP)

(72) Inventors: Tsutomu Tashiro, Nagoya (JP);
Tsuyoshi Okamoto, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/765,091

(22) Filed: Feb. 12, 2013

(65) Prior Publication Data

US 2013/0211650 A1    Aug. 15, 2013

(30) Foreign Application Priority Data

Feb. 13, 2012 (JP) .................................... 2012-28699

(51) Int. Cl.
*B60W 20/00* (2006.01)

(52) U.S. Cl.
USPC ............................ 701/22; 701/102; 180/65.28

(58) Field of Classification Search
USPC .................................... 701/22, 36, 101, 102; 180/65.265–65.29; 903/930
See application file for complete search history.

(56) References Cited

U.S. PATENT DOCUMENTS

| 7,769,505 B2* | 8/2010 | Rask et al. ....................... 701/22 |
| 2011/0109157 A1 | 5/2011 | Tani |
| 2011/0206951 A1* | 8/2011 | Ford et al. ....................... 429/50 |

FOREIGN PATENT DOCUMENTS

| JP | 3381592 | 12/2002 |
| JP | 2008-296646 | 12/2008 |
| JP | 2010-241190 | 10/2010 |

OTHER PUBLICATIONS

U.S. Appl. No. 13/765,074 of Tashiro, filed Feb. 12, 2013.

* cited by examiner

*Primary Examiner* — Richard Camby
(74) *Attorney, Agent, or Firm* — Nixon & Vanderhye PC

(57) ABSTRACT

A control device for a hybrid vehicle includes an engine operating point setting device, a coolant temperature prediction device, a battery state-of-charge prediction device, and a determination device. The determination device determines whether an amount of heat of coolant is short or excess based on coolant temperature predicted by the coolant temperature prediction device and determines whether an amount of charge of a battery is short or excess based on SOC of the battery predicted by the battery state-of-charge prediction device. When at least one of the amount of heat and the amount of charge is short or excess as a result of the determination by the determination device, the engine operating point setting device sets an engine operating point, which is shifted in a direction to eliminate the shortage or the excess.

4 Claims, 8 Drawing Sheets

CONTROL DEVICE FOR HYBRID VEHICLE

CROSS REFERENCE TO RELATED APPLICATION

This application is based on Japanese Patent Application No. 2012-28699 filed on Feb. 13, 2012, the disclosure of which is incorporated herein by reference.

TECHNICAL FIELD

The present disclosure relates to a control device of a hybrid vehicle.

BACKGROUND

One control device of a hybrid vehicle is disclosed in patent document 1 (JP-A-2010-241190). This control device predicts a warming-up time of an engine and a charging time of a battery at the time of cold-starting the engine and extracts a set of operating points in which an engine warming-up completion timing and a battery charging completion timing are included within a given range and performs a load operation at any one of the operating points of the extracted set.

The conditions of cold-starting the engine are not constant but are variously changed. For example, only by adding a load of generating electricity, the charging of the battery is completed before the warming-up of the engine is completed or the warming-up of the engine is completed before the charging of the battery is completed.

Regarding this, according to the control device of the hybrid vehicle disclosed in the patent document 1 (JP-A-2010-241190), the warming-up of the engine and the charging of the battery are surely completed within a given range. Hence, this can eliminate a continuous idling operation of no load and a continuous release of thermal energy by the load operation. As a result, at the time of cold-starting the engine, by decreasing a difference between the engine warming-up completion timing and the battery charging completion timing, it is possible to reduce fuel consumption at a low efficiency and hence to improve a fuel economy.

By the way, in the hybrid vehicle using an engine and a motor generator as a driving source for driving the vehicle, when the vehicle is stopped and is driven under a low-load driving condition, the engine is intermittently driven and hence the amount of heat supplied to the coolant from the engine is reduced as compared with a case where the engine is constantly driven. As a result, in the case of using heating in the winter, there arises a case where if only the amount of heat stored in an engine coolant is used for the heating, the amount of heat is short of heat for the heating. For this reason, there is introduced also a vehicle having an electric heating system mounted thereon as a heating apparatus in addition to a heater core for supplying heat for the heating taken out the engine coolant to an interior of a vehicle compartment, the electric heating system supplying heat for the heating to the interior of the vehicle compartment by making use of electricity supplied from a battery. The heater core is a heat load of consuming the amount of heat of the engine coolant and the electric heating system is an electricity load of consuming the electricity of the battery. In this regard, other heat loads mounted in the vehicle include a battery warming-up unit of utilizing the heat of the engine coolant and the like and other electricity loads mounted in the vehicle include electric power steering and the like.

Further, in the related art, an engine operating point is selected from the viewpoint of reducing fuel consumption to the lowest level on a line called an optimum fuel economy line. The optimum fuel economy line is a line connecting points in which the fuel consumption becomes minimal for a shaft output of an engine among the engine operating points which are equal to each other in the shaft output of the engine. The reason why this line is used is that a fuel economy of the vehicle is calculated as the fuel consumption to a mileage. In the other words, fuel is transformed into a shaft output at as high an efficiency as possible to thereby reduce a ratio at which the fuel is transformed into the amount of heat for heating the coolant.

However, if the amount of heat of the engine coolant and the amount of charge of the battery become short or excess depending on the state of consumption of the heat load and the electricity load, the engine operating point on the optimum fuel economy line cannot be continuously selected. In this case, in order to bring the amount of heat and the amount of charge into adequate states, as will be described below, there is a possibility that an engine operating point greatly separate from the optimum fuel economy line needs to be selected and hence fuel consumption will be increased.

For example, in a case where the amount of charge of the battery is excess or adequate and the amount of heat is short, in order to generate heat while reducing the amount of electricity generated, the ratio of the shaft output of the engine needs to be reduced to increase the ratio of an amount of heat for heating the coolant and hence an engine operating point separate from the optimum fuel economy line needs to be selected. In this case, as the ratio of the shaft output of the engine is further decreased and hence the ratio of the amount of heat for heating the coolant is further increased, an engine operating point more separate from the optimum fuel economy line is selected. This will increase the fuel consumption.

Even in a case where both of the amount of heat and the amount of charge are short, if an adequate engine operating point is not set in consideration of a balance between the amount of heat and the amount of charge, there is likely to bring about a state where only the amount of heat is short. Regarding this case, in patent document 1 (JP-A-2010-241190), as described above, a set of engine operating points are extracted in which the engine coolant temperature at the warming-up completion timing and the state of charge of battery at the charging completion timing are reached at the same time.

However, in JP-A-2010-241190, without consideration of the state of consumption of the heat load and the electricity load, the set of engine operating points are extracted in which the engine coolant temperature at the warming-up completion timing and the state of charge of battery at the charging completion timing are reached at the same time. Hence, for example, in a case where the amount of heat consumed by the heat load is especially large as compared with the amount of charge consumed by the electricity load, even if the disclosure in JP-A-2010-241190 is performed, there will be brought about a state where only the amount of heat is short. For this reason, in order to eliminate the shortage of the amount of heat, as described above, an engine operating point must be selected which is greatly separate from the optimum fuel economy line and which is hence bad in the fuel economy.

Further, even in a case where both of the amount of heat and the amount of charge are short and the amount of heat is very shorter than the amount of charge, in a case where the amount of charge consumed by the electricity load is larger than the amount of heat consumed by the heat load, the amount of charge will be reduced. Hence, even if the engine operating point on the optimum fuel economy line is continuously selected, the amount of heat and the amount of charge can be brought into adequate states.

However, since the patent document 1 (JP-A-2010-241190) does not take the state of consumption of the heat load and the state of consumption of the electricity load into account, even in this case, as described above, the set of engine operating points are extracted in which the engine coolant temperature at the warming-up completion timing and the state of charge of the battery at the charging completion timing are reached at the same time and an engine operating point in which the fuel consumption is minimal is selected from among the engine operating points of the extracted set. In the first place, the engine operating points of the extracted set are greatly separate from engine operating points on the optimum fuel economy line, so that the engine operating points of the extracted set are increased in the fuel consumption as compared with the engine operating points on the optimum fuel economy line.

Further, even in a case where the amount of charge and the amount of heat are within adequate ranges, in a case where the amount of heat consumed by the heat load is considerably larger than the amount of charge consumed by the electricity load, as time passes, a state will be brought about in which the amount of heat is short.

However, regarding this case, the disclosure in JP-A-2010-241190 is performed in a case where the amount of charge and the amount of heat are short and does not take the state of consumption of the heat load and the state of consumption of the electricity load into account, so that the disclosure in JP-A-2010-241190 is not performed in this case and hence a state will be brought about in which the amount of heat is short. For this reason, in order to eliminate the state in which the amount of heat is short, as described above, the engine operating point must be selected which is greatly separate from the optimum fuel economy line and which is hence bad in the fuel consumption, so that the fuel consumption will be increased.

Further, in a case where the amount of charge and the amount of heat are excess, it can be considered to stop driving the vehicle by the engine to thereby prevent the generation of the heat and to drive the vehicle by the motor to thereby accelerate the consumption of the electricity.

However, for example, if this control is performed when the heat and the electricity are possibly consumed by the heating, contrarily, a state will be brought about in which the heat and the electricity are short. As a result, in order to bring the amount of heat and the amount charge into adequate states, an engine operating point greatly separate from the optimum fuel economy line needs to be selected, which results in increasing the fuel consumption.

SUMMARY

The present disclosure addresses at least one of the above issues.

According to the present disclosure, there is provided a control device for a hybrid vehicle. The hybrid vehicle includes an engine, a battery, a motor generator, a heat load, and an electricity load. The engine is configured to output driving force for driving the vehicle and driving force for generating electricity. The battery is charged with electricity and discharges electricity. The motor generator is capable of outputting driving force for driving the vehicle by the electricity discharged from the battery and is capable of generating electricity by the driving force outputted from the engine to supply the battery with electricity. The heat load is configured to consume heat of coolant of the engine. The electricity load is configured to consume the electricity of the battery. The control device is disposed in the hybrid vehicle and includes an engine operating point setting means, a coolant temperature prediction means, a battery state-of-charge prediction means, and a determination means. The engine operating point setting means is for setting an engine operating point when the engine is operated. The coolant temperature prediction means is for predicting coolant temperature after a predetermined period of time based on a state in which the heat load consumes the heat. The battery state-of-charge prediction means is for predicting a state of charge of the battery after the predetermined period of time based on a state in which the electricity load consumes the electricity. The determination means is for determining whether an amount of heat of coolant is short or excess based on the coolant temperature predicted by the coolant temperature prediction means and is for determining whether an amount of charge of the battery is short or excess based on the state of charge of the battery predicted by the battery state-of-charge prediction means. When at least one of the amount of heat and the amount of charge is short or excess as a result of the determination by the determination means, the engine operating point setting means sets the engine operating point, which is shifted in a direction to eliminate the shortage or the excess of the at least one of the amount of heat and the amount of charge.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
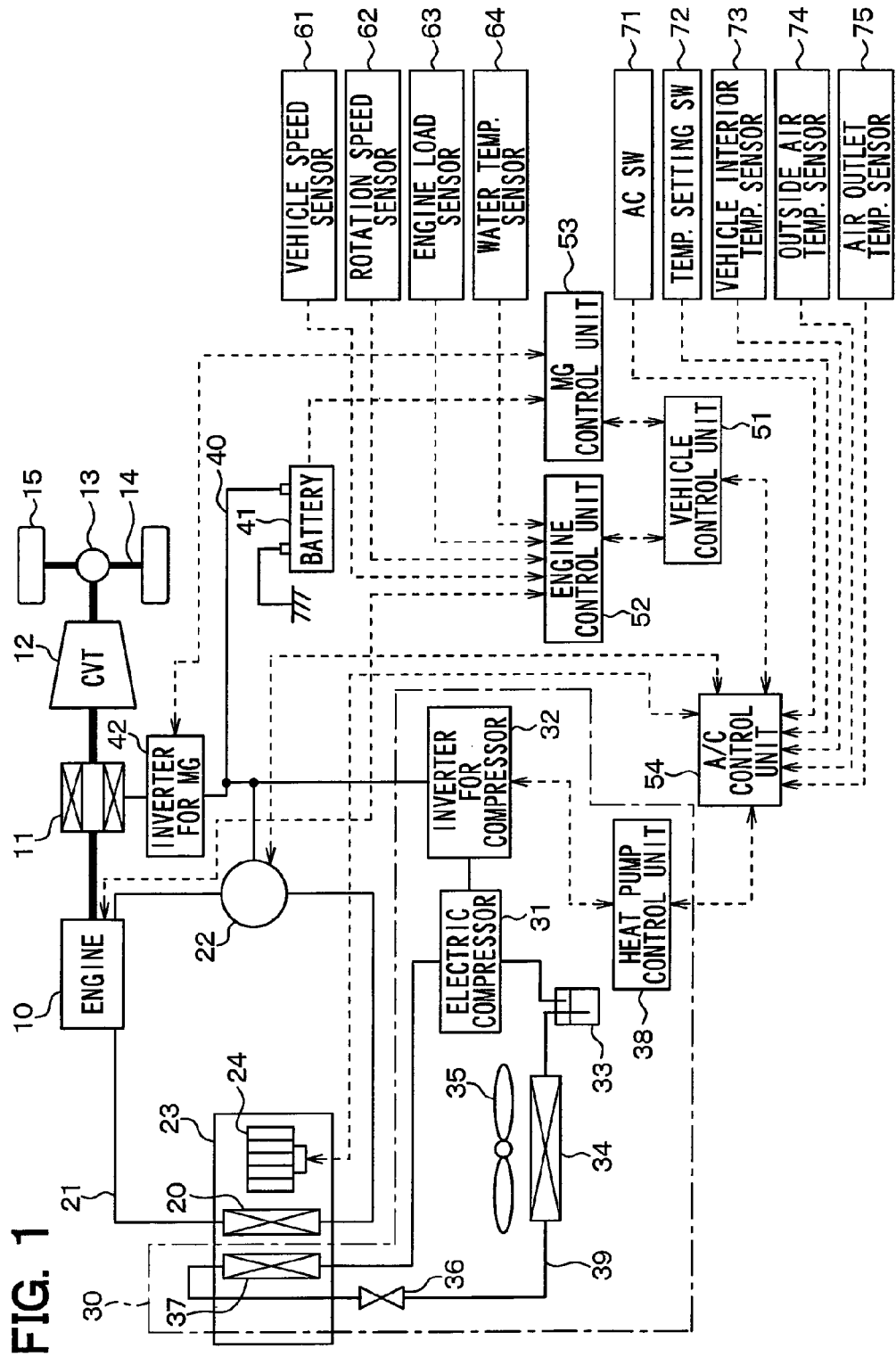
FIG. 1 is a diagram to show a schematic construction of a general system mounted in a hybrid vehicle in a first embodiment.

A schematic construction of a general system mounted in a hybrid vehicle in the present embodiment will be shown in FIG. 1. The hybrid vehicle in the present embodiment is provided with an engine 10 and a motor generator (MG) 11.

The engine 10 outputs a driving force for driving a vehicle and a driving force for making the motor generator 11 generate electricity. The engine 10 is a gasoline engine or a diesel engine.

The motor generator 11 functions as a motor for driving the vehicle or as a generator. When the motor generator 11 is supplied with electricity, the motor generator 11 is rotatively driven to be able to output the driving force for driving the vehicle. Alternately, the motor generator 11 can generate electricity by using the engine 10 or the like as a power source to thereby charge up a battery 41. The motor generator 11 is of a synchronous type in which a rotor has a permanent magnet embedded therein and in which a stator has a stator coil wound thereon.

The motor generator 11 has a three-phase alternating current applied thereto, thereby being controlled, the three-phase alternating current being generated by an inverter 42 for the MG. The inverter 42 for the MG is connected to a power circuit 40 and the power circuit 40 has the battery 41 connected thereto. The battery 41 is supplied with electricity from the motor generator 11 or the like (charging) and supplies the electricity to the motor generator 11 or the like (discharging).

The engine 10 is coaxially coupled to the motor generator 11 and the motor generator 11 is coupled to a continuously variable transmission 12 which automatically changes a continuously variable transmission gear ratio according to a vehicle speed and an accelerator opening. An output shaft of the continuously variable transmission 12 is coupled to vehicle wheels 15 via a differential 13 and an axle 14. Here, a clutch may be interposed between the engine 10 and the motor generator 11.

A driving mode of the hybrid vehicle of the present embodiment includes "a motor driving mode", "an engine driving mode", "a motor assist driving mode", and "a driving generating mode". In "the motor driving mode", the vehicle is driven only by the power of the motor generator. In "the engine driving mode", the vehicle is driven only by the power of the engine.

In "the motor assist driving mode", the vehicle is driven by the power of the engine with the power of the engine being assisted by the motor generator. In "the driving generating mode", the vehicle is driven by the power of the engine with a portion of the power of the engine being used as the power for making the motor generator generate the electricity.

The hybrid vehicle of the present embodiment is provided with a heater core 20 and a heat pump system 30 as a heating apparatus.

The heater core 20 is a heating unit for taking out heat from an engine coolant and for supplying the heat for heating to an interior of a vehicle compartment and is a heat exchanger that is housed in an air conditioner case 23 of a vehicular air conditioner and that exchanges heat between the engine coolant and a feed air fed to the interior of the vehicle compartment. The air conditioner case 23 houses a blower 24 for feeding air to the interior of the vehicle compartment.

The engine 10 has a water jacket formed in a cylinder block and in a cylinder head. The engine coolant is circulated and supplied to the water jacket, whereby the engine 10 is cooled. To the water jacket is connected a coolant circulation passage 21 made of a coolant pipe or the like and the coolant circulating passage 21 is provided with an electric pump 22 for circulating the coolant. By changing a discharge rate of the electric pump 22, a flow rate of the coolant circulated in the coolant circulation passage 21 is regulated.

The coolant circulating passage 21 is provided in such a way as to be extended from an exit side of the engine 10 to the heater core 20 (heat exchange part) and to be returned again to the engine 10 via the heater core 20. The air fed from the blower 24 is passed through the heater core 20 to exchange heat with the coolant, thereby being heated and made into hot air. Then, the hot air is blown into the interior of the vehicle compartment from a blowoff port. In this construction, by controlling the discharge rate of the electric pump 22 and a feed air volume of the blower 24, an amount of heat to be supplied from the coolant to the interior of the vehicle compartment via the heater core 20.

The heat pump system 30 is an electric heating system for supplying heat for heating to the interior of the vehicle compartment by making use of electricity. The heat pump system 30 is provided with an electric compressor 31, an inverter 32 for a compressor, an indoor heat exchanger 37 (heat exchange part), an outdoor heat exchanger 34, an expansion valve 36, an accumulator 33, a refrigerant circulation passage 39 made of a refrigerant pipe or the like and for connecting these parts, and a heat pump control unit 38.

The electric compressor 31 compresses the refrigerant to thereby heat the refrigerant and discharges the heated refrigerant to the indoor heat exchanger 37. The electric compressor 31 is driven by electricity supplied from the inverter 32 for a compressor. The inverter 32 for a compressor is controlled by the heat pump control unit 38.

The indoor heat exchanger 37 is a heat exchanger that is arranged in the air conditioner case 23 of the vehicular air conditioner and that exchanges heat between the coolant discharged from the electric compressor 31 and the feed air to be fed to the interior of the vehicle compartment. When the air fed from the blower 24 is passed through the indoor heat exchanger 37, the air exchanges heat with the refrigerant, thereby being heated and made into hot air. Then, the hot air is blown off into the interior of the vehicle compartment from a blowoff port. At this time, the refrigerant exchanges heat with the air, thereby being cooled. The refrigerant after passing through the indoor heat exchanger 37 has pressure reduced by the expansion valve 36 and flows into the outdoor heat exchanger 34.

The outdoor heat exchanger 34 is a heat exchanger that is arranged outside the vehicle compartment and that exchanges heat between the refrigerant and outside air. The outdoor heat exchanger 34 has the outside air fed thereto by a fan 35. The refrigerant having pressure reduced exchanges heat with the outside air in the outdoor heat exchange 34, thereby being heated. The heated refrigerant passes through the accumulator 33 and flows into the electric compressor 31.

In this construction, the driving state of the electric compressor 31 is controlled, whereby the amount of heat to be supplied from the heat pump system 30 to the interior of the vehicle compartment via the indoor heat exchanger 37 is controlled.

The hybrid vehicle of the present embodiment is provided with control units such as a vehicle control unit 51, an engine control unit 52, an MG (motor generator) control unit 53, and an air conditioning control unit 54.

Each of these control units 51 to 54 is mainly constructed of a microcomputer including a CPU, a ROM, a RAM, and the like, and executes various control programs stored in the ROM to thereby perform various kinds of control.

The engine control unit 52 controls a driving state of the engine 10 on the basis of detection signals inputted from various kinds of sensors. The various kinds of sensors include a vehicle speed sensor 61 for detecting a speed of the vehicle, a rotation speed sensor 62 for detecting a rotation speed of the engine 10, an engine load sensor 63 for detecting a load of the engine 10 such as an intake air volume and an intake pipe negative pressure, and a coolant temperature sensor 64 for detecting the temperature of the coolant in the water jacket. Specifically, the engine control unit 52 performs fuel injection control by a fuel injection valve, an ignition timing control by an ignition control device, valve timing control by a valve drive mechanism on an intake side and on an exhaust side, and intake air volume control by a throttle valve.

The MG control unit 53 controls a driving state of the motor generator 11. Further, the MG control unit 53 calculates a state of charge (referred to as "SOC") of a battery 41 on the basis of a measured value of an output current of the battery 41 measured by a current sensor and a predetermined maximum capacity of the battery 41. Specifically, the measured value of the current sensor is integrated and the SOC is calculated as a ratio of the integrated value to the predetermined maximum capacity of the battery 41. The calculated SOC is outputted to the vehicle control unit 51. Hence, in the present embodiment, the MG control unit 53 corresponds to a battery state-of-charge detection means for detecting the state of charge of the battery 41.

The air conditioning control unit 54 controls the electric pump 22, the blower 24, and the heat pump control unit 38 on the basis of signals inputted from various kinds of sensors and from various kinds of switches. The various kinds of sensors and the various kinds of switches include an A/C switch 71 for turning on and off an air conditioner, a temperature setting switch 72 by which a driver sets a target value of a vehicle interior temperature (target temperature), a vehicle interior temperature sensor 73 for detecting a vehicle interior temperature, an outside air temperature sensor 74 for detecting an outside air temperature, and an air outlet temperature sensor 75 for detecting a temperature of air-conditioned air fed from the heater core 20 or the indoor heat exchanger 37 to the interior of the vehicle compartment via an air conditioner blowoff port.

In order to manage the driving and the energy of the vehicle, the vehicle control unit 51 outputs a target engine torque command and a target engine rotating speed command to the engine control unit 52 and outputs a target MG torque command and a target MG rotating speed command to the MG control unit 53 and outputs a speed change command to a transmission control unit (not shown) and outputs a cooperation control command with a regeneration brake to a brake control unit (not shown) and provides the air conditioning control unit 54 with instructions of an amount of heat for heating that the electric heating system 30 is to supply and an amount of heat for heating that the heater core 20 is to supply.

A control process of the vehicle control unit 51 is divided into a driving control process and an energy management process. Of these two processes, the driving control process calculates the target engine torque command, the target engine rotating speed command, the target MG torque command, the target MG rotating speed command, the speed change command, and the cooperation control command with a regeneration brake, which are commands relating to the driving, according to an accelerator pedal operation by the driver and to the states of respective components and systems of the vehicle and a command from the energy management process, in such a way that an acceleration request of the driver is satisfied and that the engine 10 is driven at a high efficient operating point. On the other hand, in the energy management process, in consideration of electricity to be inputted to and outputted from the battery 41 that stores the electricity and heat to be inputted to and outputted from the coolant that stores the heat, the amount of heat for heating that the electric heating system 30 is to supply and the amount of heat for heating that the heater core 20 is to supply are determined in such a way that the electricity and the heat are suitably stored in the battery 41 and the coolant respectively. The energy management process provides the air conditioning control unit 54 with the instructions of the amount of heat for heating that the electric heating system 30 is to supply and the amount of heat for heating that the heater core 20 is to supply and provides the driving control process with an instruction.

The vehicle control unit 51 has information relating to a heating operation (heating is ON or OFF) inputted from the air conditioning control unit 54.

Next, the contents of the energy management process will be described. The energy management process is a process for managing the storages of electricity and heat in the battery 41 and the coolant in suitable states. To realize this, the energy management process manages an SOC for the battery 41 and manages a coolant temperature for the coolant.

First, a target SOC range and a target coolant temperature range are previously set (initial setting). That is, an upper limit and a lower limit are previously set for the target SOC and the target coolant temperature, respectively.

Figure 2A:
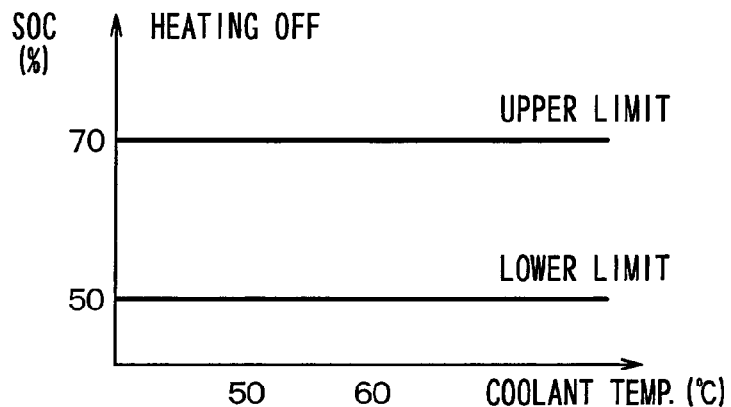
FIG. 2A is a map for determining a target SOC range when heating is OFF, which is used in the first embodiment.

The target SOC range is set at different ranges between when heating is ON and when heating is OFF. FIG. 2A is a map for determining a target SOC range used when the heating is OFF and FIG. 2B is a map for determining a target SOC range used when the heating is ON.

As shown in FIG. 2A, when the heating is OFF, the upper limit and lower limit of the target SOC range are set at constant temperatures, for example, at 70% and 50% regardless of the coolant temperature. At this time, the upper limit of the target SOC range is set at a given value lower than 100%. The reason is as follows: the SOC is not measured directly but is calculated, so an error is caused; hence, the upper limit of the SOC range is set in consideration of the error. Further, this is because the battery 41 easily deteriorates if the SOC is a state close to 100% even if the target SOC is not 100%.

Figure 2B:
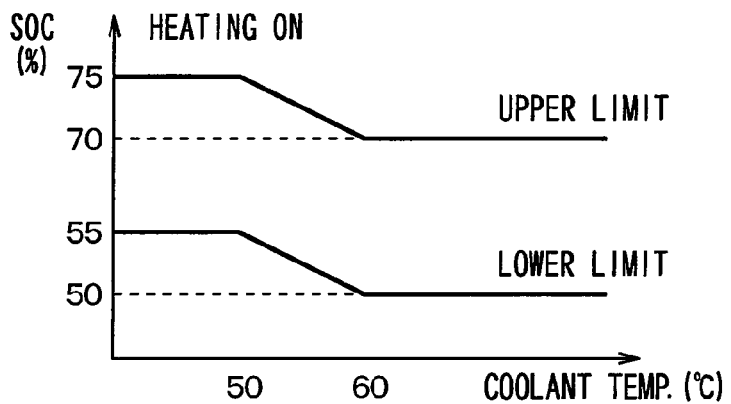
FIG. 2B is a map for determining a target SOC range when the heating is ON, which is also used in the first embodiment.

As shown in FIG. 2B, when the heating is ON, in a temperature range in which the coolant temperature is such a comparatively low temperature that makes it difficult to take a sufficient amount of heat from the heater core 20, the upper limit and the lower limit of the target SOC are set high in order to secure electricity consumed by the heat pump system 30, that is, the electric heating system 30. Specifically, in a range in which the coolant temperature is a first given temperature or more, for example, 60° C. or more, the upper limit and the lower limit of the target SOC are set at the same upper limit and the same lower limit as when the heating is OFF. In a range in which the coolant temperature is a second given temperature or less, for example, 50° C. or less, the upper limit and the lower limit of the target SOC are set at a higher upper limit and a higher lower limit than when the heating is OFF, for example, 75% and 55%, respectively.

In this way, if the upper limit of the target SOC when the heating is ON is not too close to 100%, the upper limit of the target SOC when the heating is ON can be set slightly higher than the upper limit of the target SOC when the heating is OFF. By the way, in a case where the upper limit of the target SOC is set slightly higher, if the electricity is not consumed and hence the SOC is made too high by the electricity generated, the battery 41 easily deteriorates. In contrast, when the heating is ON, the electricity is consumed by the electric heating system 30, so that even if the upper limit of the target SOC is set slightly higher, the SOC does not come too close to 100%.

On the other hand, the upper limit of the target coolant temperature is set at a constant temperature, for example, at 100° C. regardless of whether the heating is ON or OFF, but the lower limit of the target coolant temperature is set at different temperatures between when the heating is ON and when the heating is OFF. When the heating is OFF, the lower limit of the target coolant temperature is set at a temperature at which the warming-up of the engine is determined to be finished, for example, at 40° C., whereas when the heating is ON, the lower limit of the target coolant temperature is previously set at a temperature at which heat for heating is determined to be supplied from the heater core 20, for example, at 35 to 50° C. (initial setting).

This temperature depends on the heating capacity of the electric heating system 30. That is, in a case where the amount of heat for heating that the electric heating system 30 can supply is small, a large amount of heat for heating needs to be supplied from the heater core 20, so that the coolant temperature needs to be kept at a higher temperature and hence is set, for example, at 50° C. On the other hand, in a case where the amount of heat for heating that the electric heating system 30 can supply is large, an amount of heat for heating that the heater core 20 is to supply is small, so that when the warming-up of the engine is finished, the heater core 20 can already supply a sufficient amount of heat for heating. Hence, in this case, even if the heating is ON, the lower limit of the target coolant temperature is set at a temperature equal to or lower than the lower limit of the target coolant temperature when the heating is OFF, for example, at 40° C. or 35° C.

Next, there will be described a determination process of determining an amount of heat for heating that the electric heating system 30 is to supply and an amount of heat for heating that the heater core 20 is to supply, which are provided to the air conditioning control unit 54. A heat distribution of two kinds of heating means of the heater core 20 and the electric heating system 30 is determined, the heater core 20 supplying the heat for heating from heat taken out of the coolant, the electric heating system 30 supplying the heat for heating by the electricity from the battery 41. At this time, in the following manner, an amount of heat for heating that the heater core 20 is to supply and an amount of heat for heating that the electric heating system 30 is to supply are determined in such a way that a predetermined relationship is established between the coolant temperature and the SOC after a given period of time.

This determination process is repeatedly performed only in a case where the coolant temperature is a given temperature or lower. The case where the coolant temperature is a given temperature or lower means a case where the heat for heating is not sufficiently supplied only by the heater core 20, and the given temperature is a temperature at which a necessary amount of heat for heating can be sufficiently supplied only by the heater core 20, for example, 60° C. Further, this determination process is performed in a case where the coolant temperature is higher than a temperature at which heating can be started. The temperature at which heating can be started means a coolant temperature at which heating can be started by both of the heater core 20 and the electric heating system 30 and is a temperature that is varied depending on the heating capacity of the electric heating system 30, as described above.

Figure 3:
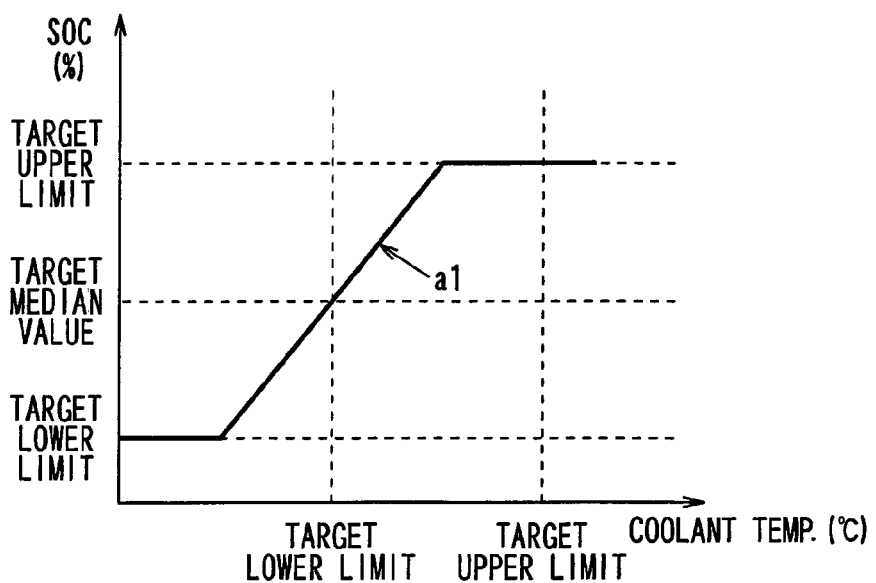
FIG. 3 is a schematic graph to show a target SOC—coolant temperature function used in the first embodiment.

First, a target SOC—coolant temperature function (hereinafter referred to as "target function") is set in advance. An example of a target function will be shown in FIG. 3. This target function, as shown in FIG. 3, is expressed on a coordinate system having two axes of coordinates of SOC and coolant temperature. Specifically, the target function changes along a straight line passing a point having a coordinate of a median value of a target SOC range and a coordinate of a lower limit of the target coolant temperature and having a given gradient of a1 and is kept at the upper limit or the lower limit of the target SOC when the target function reaches the upper limit or the lower limit of the target SOC.

The target SOC range used at this time is a range between an upper limit and a lower limit of the coolant temperature at this time and the median value of the target SOC range is, for example, 65% when the coolant temperature is 45° C. and is 62.5% when the coolant temperature is 55° C. In this way, the target SOC range and the median value of the target SOC range are different depending on the coolant temperature at that time. The reason why the target function is the straight line passing the median value of the target SOC range is that the SOC needs to be positioned within the target SOC range with an allowance. The lower limit of the target coolant temperature, as described above, is set in advance by the heating capacity of the electric heating system 30 mounted in the vehicle and is set at, for example, 40° C. The reason why the target function is the straight line passing not the median value but the lower limit of the target coolant temperature is as follows: that is, fuel is consumed to raise the temperature of the coolant; and if the temperature of the coolant is excessively higher, heat radiation loss is caused; hence it is only necessary that a minimum temperature required for the heating is reached.

The given gradient of a1 is a gradient of an approximate straight line when a relationship between the coolant temperature and the SOC in a case where an engine operating point is selected in such a way as to reduce fuel consumption on a first optimum fuel economy line to be described later when the heating is OFF and the vehicle is driven in a driving pattern previously set as a comparatively low load driving pattern including a driving stop is expressed on the coordinate axes, and the given gradient of a1 is experimentally determined. The reason of the comparatively low load driving pattern is to set a condition under which the temperature of the coolant is kept in a range of 60° C. or less in which the control of the present disclosure is required. In this regard, the gradient of the approximate straight line of expressing a relationship between the coolant temperature and the SOC is varied by a distribution of a driving force for driving the vehicle and a driving force for generating the electricity at a shaft output of the engine, but because the driving pattern is specified and the heating is OFF, a variation in the gradient calculated from the experiment results is within a small range. For example, the gradient is calculated by calculating an average in this range.

Thus, in a case where an operating point of the SOC and the coolant point is positioned on any point on the straight line having the given gradient a1, if an engine operating point on the first optimum fuel economy line is selected to operate the engine 10, a change in the SOC which is caused by generating the electricity by the engine and a change in the coolant temperature which is caused by heating the coolant by the engine are varied along the straight line having the gradient of a1. For this reason, when the amount of heat for heating that the heater core 20 is to supply and the amount of heat for heating that the electric heating system 30 is to supply are set, if the SOC and the coolant temperature are set on the straight line, the engine is driven at the operating point in which the fuel consumption becomes small on the first optimum fuel economy line, whereby the SOC and the coolant temperature can be held on this straight line.

In addition, a prediction period is set in advance which is used when the amount of heat for heating that the heater core 20 is to supply and the amount of heat for heating that the electric heating system 30 is to supply are determined in such a way that an operating point will be positioned on the target function in the near future from an operating point expressed by the present SOC and the present coolant temperature. This is a period of time after which the operating point of the SOC and the coolant temperature will be positioned on the target function and is set within a range from 40 to 120 seconds. An example of a relationship between a prediction period and an SOC will be shown in FIG. 4.

Figure 4:
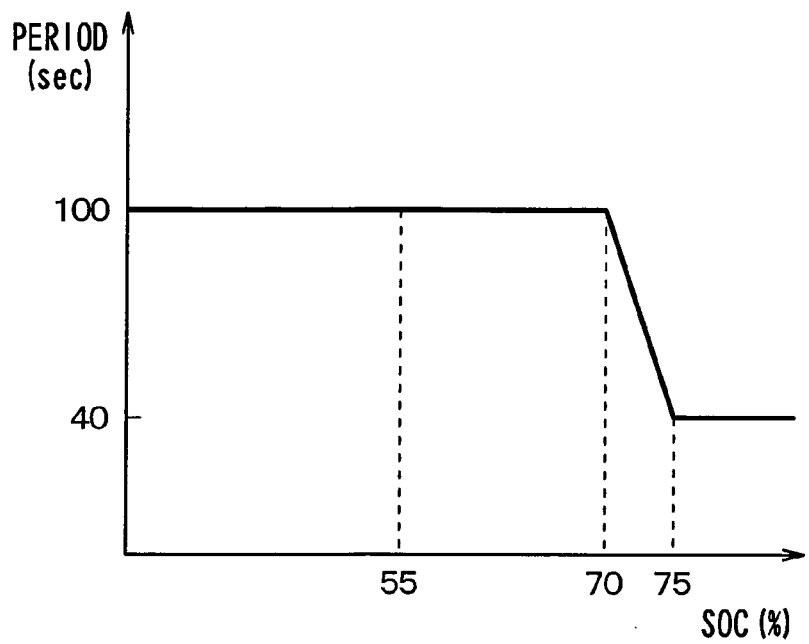
FIG. 4 is a control map to show a relationship between a prediction period and an SOC, which is used in the first embodiment.

For example, as shown in FIG. 4, in a range in which the SOC is lower than 70%, a period of 100 seconds is set as a first period, and in a range in which the SOC is higher than 75%, a period of 40 seconds is set as a second period which is shorter than the first period, and in a range in which the SOC is from 70% to 75%, as the SOC becomes higher, the period is set at from 100 to 40 seconds in such a way as to become smaller.

In this way, in a case where the SOC is lower than the upper limit of the target SOC, the first period set longer is used as the prediction period, whereas in a case where the SOC is higher than the upper limit of the target SOC, the second period set shorter than the first period is used as the prediction period. The first period is set longer to prevent a problem that the distribution of the amount of heat for heating that the heater core 20 is to supply and the amount of heat for heating that the electric heating system 30 is to supply is greatly changed to impair comfortableness. The second period is set shorter than the first period because the SOC needs to be quickly reduced when the SOC is higher than the target SOC.

Next, a predicted total amount of heat for heating is calculated. This is an amount of heat for heating to be supplied during the prediction period and is a value in a case where a required amount of heat for heating at that time is continued during the prediction period. At this time, the amount of heat for heating that the heater core 20 is to supply and the amount of heat for heating that the electric heating system 30 is to supply are calculated by making use of a heater core model and an electric heating system model, respectively. The heater core model and the electric heating system model are relationship formulas for drawing an output value from an input value and are formulas drawn from an experiment or the like. Here, in place of the relationship formula, a map showing a given relationship between the input value and the output value may be used.

As the heater core model are employed two prediction models, for example, a coolant temperature prediction model and a prediction model of predicting an amount of heat consumed by the coolant. When an amount of heat consumed for heating and a period are inputted to the coolant temperature prediction model, the coolant temperature prediction model outputs a variation in the coolant temperature after the period, whereas when a variation in the coolant temperature and a period are inputted to the prediction model of predicting an amount of heat consumed by the coolant, the prediction model of predicting an amount of heat consumed by the coolant outputs an amount of heat for heating that the heater core 20 is to supply which is to be set during the period. On the other hand, as the electric heating system model are employed two models of an SOC prediction model and a prediction model of predicting an amount of heat for heating that an electric heating system is to supply. When an amount of heat consumed for heating and a period are inputted to the SOC prediction model, the SOC prediction model outputs a variation in battery SOC after the period, whereas when the variation in battery SOC and the period are inputted to the prediction model of predicting an amount of heat for heating that an electric heating system is to supply, the prediction model of predicting an amount of heat for heating that an electric heating system is to supply outputs an amount of heat for heating that the electric heating system is to supply during the period.

Then, among combinations of the SOC and the coolant temperature for realizing the predicted total amount of heat for heating on the assumption that both of the amount of heat for heating that the heater core supplies and the amount of heat for heating that the electric heating system supplies are held at constant values during the prediction period, the SOC and the coolant temperature for realizing an operating point nearest to the target function are selected. That is, a coolant temperature in a case where the predicted total amount of heat for heating is supplied only by the heater core 20 is calculated by the coolant temperature prediction model and an SOC in a case where the predicted total amount of heat for heating is supplied only by the electric heating system 30 is calculated by the SOC prediction model, and in a case where a line of connecting both of the coolant temperature and the SOC meets the target function at an intersection, the intersection is selected as a target operating point, whereas in a case where the line of connecting both of the coolant temperature and the SOC does not meet the target function, an operating point nearest to the target function is selected as a target operating point.

Figure 5:
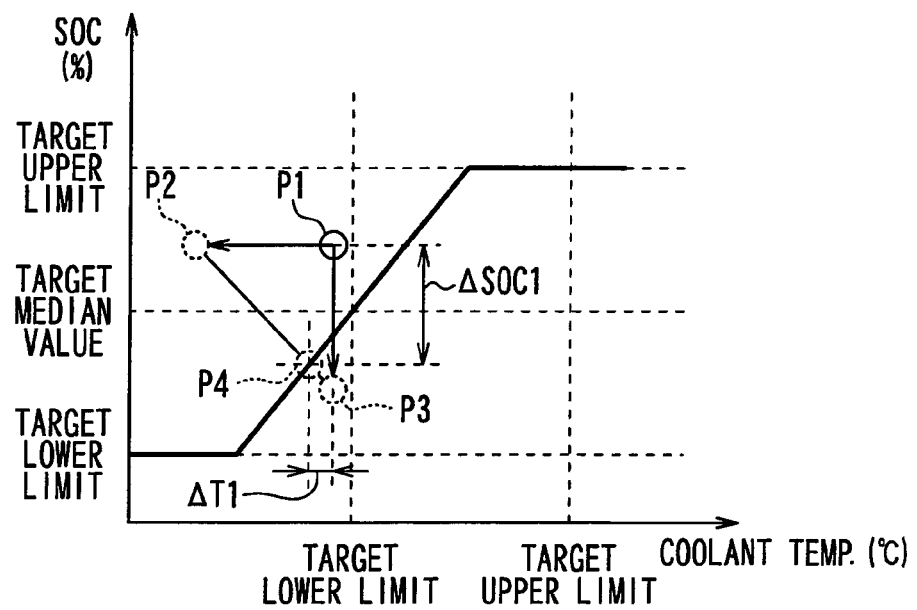
FIG. 5 is a graph to show an example of selecting a target operating point of an SOC and a coolant temperature in the first embodiment.
Figure 6:
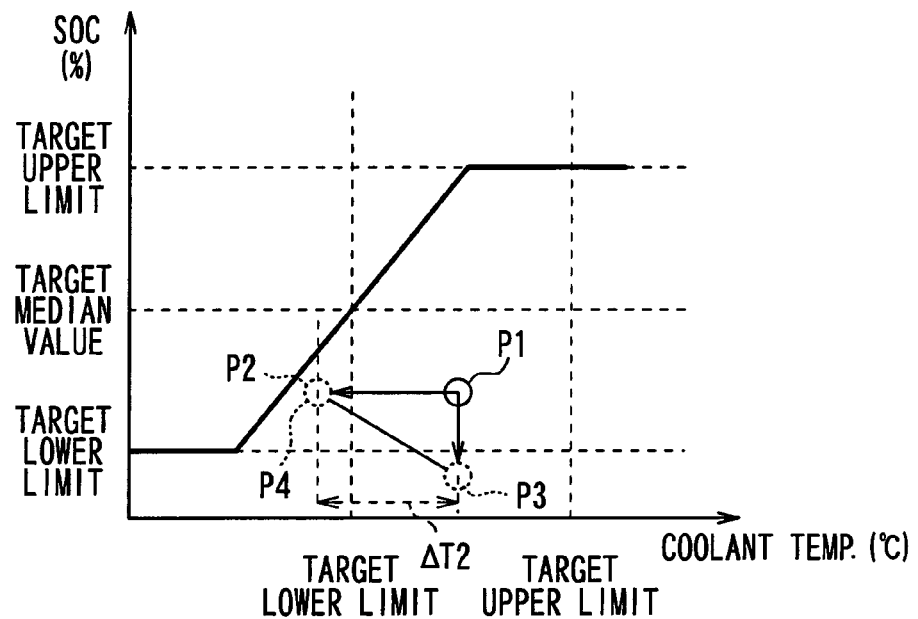
FIG. 6 is a graph to show an example of selecting a target operating point of an SOC and a coolant temperature in the first embodiment.

Here, specific examples of a method for selecting a target operating point of an SOC and a coolant temperature will be shown in FIG. 5 and FIG. 6.

For example, as shown in FIG. 5, by calculating a coolant temperature after the supply of the predicted total amount of heat for heating by the heater core 20 on the basis of the present operating point P1, an operating point P2 after a prediction period when the predicted total amount of heat for heating is supplied by the heater core 20 is found. Further, by calculating an SOC after the supply of the predicted total amount of heat for heating by the electric heating system 30 on the basis of the present operating point P1, an operating point P3 after a prediction period when the predicted total amount of heat for heating is supplied by the electric heating system 30 is found. Then, an intersection of a straight line for connecting the operating point P2 and the operating point P3 and the target function is made a target operating point P4 to be selected. A difference in coolant temperature (ΔT1) and a difference in SOC (ΔSOC1) between this target operating point P4 and the present operating point P1 are a temperature variation corresponding to the amount of heat for heating that the heater core 20 is to supply and an SOC variation corresponding to the amount of heat for heating that the electric heating system 30 is to supply, respectively.

Further, as shown in FIG. 6, as in the case of FIG. 5, the operating point P2 after a prediction period when the predicted total amount of heat for heating is supplied by the heater core 20 is found, and the operating point P3 after a prediction period when the predicted total amount of heat for heating is supplied by the electric heating system 30 is found. Then, a straight line for connecting the operating point P2 and the operating point P3 does not meet the target function, so that an operating point P2 nearest to the target function is made a target operating point P4. The target operating point P4 at this time is an operating point that is nearest to the target function among operating points selected from a region of connecting the present operating point P1 and the calculated operating points P2 and P3. A difference in coolant temperature ($\Delta T2$) between this target operating point P4 and the present operating point P1 is a temperature variation corresponding to the amount of heat for heating that the heater core 20 is to supply. In the example shown in FIG. 6, it turns out that the predicted total amount of heat for heating is supplied by the heater core 20.

Next, by using a difference in the coolant temperature and a difference in the SOC between this target operating point P4 and the present operating point P1, for example, $\Delta T1$ and $\Delta SOC1$ shown in FIG. 5 and $\Delta T2$ shown in FIG. 6, the amount of heat for heating that the heater core 20 is to supply and the amount of heat for heating that the electric heating system 30 is to supply are calculated from the prediction model of predicting an amount of heat consumed by the coolant and the prediction model of predicting an amount of heat for heating that an electric heating system is to supply, respectively.

Then, the amount of heat for heating that the heater core 20 is to supply and the amount of heat for heating that the electric heating system 30 is to supply, which are calculated in this manner, are limited by the amount of heat for heating that the heater core 20 can actually supply and the amount of heat for heating that the electric heating system 30 can actually supply. This is because a maximum amount of heat that the heater core 20 can actually supply and a maximum amount of heat that the electric heating system 30 can actually supply are determined by the coolant temperature and the SOC, for example, when the coolant temperature is comparatively low, if a large amount of heat is removed from the coolant, an occupant gets a feeling that the blown-off air is cold.

Here, by comparing the amount of heat for heating that the heater core 20 is to supply and the amount of heat for heating that the electric heating system 30 is to supply, which are calculated in this manner, with the maximum amount of heat that the heater core 20 can supply and the maximum amount of heat that the electric heating system 30 can supply, it is determined whether or not the amount of heat for heating that the heater core 20 is to supply and the amount of heat for heating that the electric heating system 30 is to supply, which are calculated in this manner are larger than the maximum amount of heat that the heater core 20 can supply and the maximum amount of heat that the electric heating system 30 can supply, respectively.

In a case where the amount of heat for heating that the heater core 20 is to supply and the amount of heat for heating that the electric heating system 30 is to supply, which are calculated in this manner are not larger than the maximum amount of heat that the heater core 20 can supply and the maximum amount of heat that the electric heating system 30 can supply, the amount of heat for heating that the heater core 20 is to supply and the amount of heat for heating that the electric heating system 30 is to supply, which are calculated in this manner, are used as they are.

Figure 7:
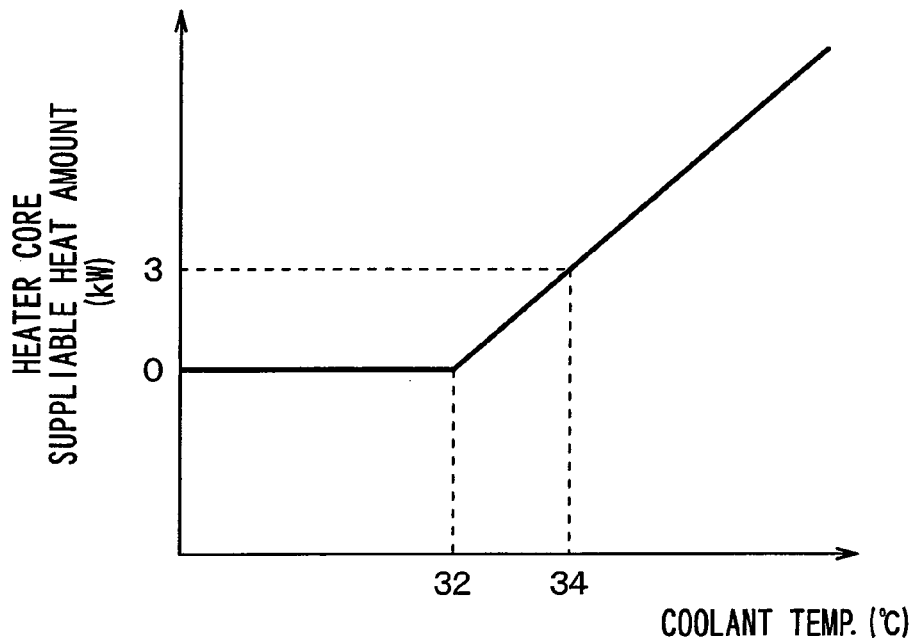
FIG. 7 is a graph to show one example of a relationship between a coolant temperature and an amount of heat that a heater core can supply in the first embodiment.

On the other hand, in a case where the amount of heat for heating that the heater core 20 is to supply and the amount of heat for heating that the electric heating system 30 is to supply, which are calculated in this manner are larger than the maximum amount of heat that the heater core 20 can supply and the maximum amount of heat that the electric heating system 30 can supply, a difference between the amount of heat for heating that the heater core 20 is to supply and the maximum amount of heat that the heater core 20 can supply and a difference between the amount of heat for heating that the electric heating system 30 is to supply and the maximum amount of heat that the electric heating system 30 can supply are calculated. In a case where there is leeway in the amount of heat that one of the heater core 20 can supply or in the amount of heat that the electric heating system 30 can supply, the calculated difference in the amount of heat is allotted to the heater core 20 or the electric heating system 30 which has the leeway. In FIG. 7 is shown an example of a relationship between the coolant temperature and an amount of heat that the heater core 20 can supply. For example, when the coolant temperature of the target operating point P4 shown in FIG. 5 is 34° C., as shown in FIG. 7, the amount of heat that the heater core 20 can supply is 3 kW and if the amount of heat for heating that the heater core 20 is to be supply is 3.5 kW, the amount of heat for heating that the heater core 20 is to be supply is short by 0.5 kW. In this case, if the calculated amount of heat for heating that the electric heating system 30 is to supply is 0.5 kW and the maximum amount of heat that the electric heating system 30 can supply is larger than the 1 kW, the amount of heat for heating that the electric heating system 30 is to supply is set at 1 kW.

However, even if the maximum amount of heat that the heater core 20 can supply is added to the maximum amount of heat that the electric heating system 30 can supply and yet the amount of heat is short, both of the maximum amount of heat that the heater core 20 can supply and the maximum amount of heat that the electric heating system 30 can supply are used.

The vehicle control unit 51 outputs the amount of heat for heating that the heater core 20 is to supply and the amount of heat for heating that the electric heating system 30 is to supply, which are determined in this way, to the air conditioning control unit 54. When the heating is ON, the air conditioning control unit 54 controls the amount of heat for heating that the heater core 20 is to supply and the amount of heat for heating that the electric heating system 30 is to supply on the basis of this command from the vehicle control unit 51. Specifically, as for the amount of heat for heating that the heater core 20 is to supply, the air conditioning control unit 54 controls a discharge rate of the electric pump 22 and an air volume of the blower 24, whereas as for the amount of heat for heating that the electric heating system 30 is to supply, the air conditioning control unit 54 controls a driving state of the electric compressor 31. In this way, in the present embodiment, the vehicle control unit 51 corresponds to a means for setting an amount of heat for heating that the heater core 20 is to supply and an amount of heat for heating that the electric heating system 30 is to supply and the air conditioning control unit 54 corresponds to a means for controlling an amount of heat for heating that the heater core 20 is to supply and an amount of heat for heating that the electric heating system 30 is to supply.

In addition, the vehicle control unit 51 determines a position of this final operating point on a map of the target function.

Figure 8:
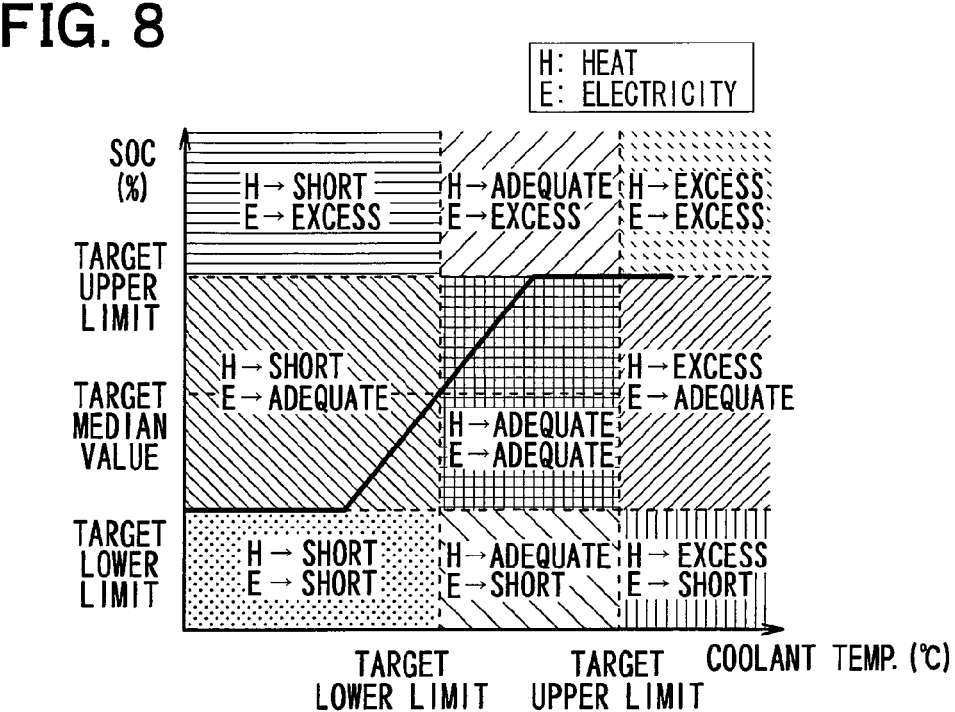
FIG. 8 is a determination map for determining a position of a target operating point of an SOC and a coolant temperature used in the first embodiment.

A map for determination will be shown in FIG. 8. The vehicle control unit 51 determines in which region shown in FIG. 8 a position of this final operating point is located and transmits this information to the driving control process.

Next, of the driving control process, a portion performed by information from the energy management process will be described. This is a process in a case where the SOC and the coolant temperature cannot be determined within a target range only by the control of the air conditioning control unit 54 or in a case where it is determined that control including the operations of the engine 10 and the motor generator 11 needs to be performed.

In particular, the control of the air conditioning control unit 54 can decrease the SOC and the coolant temperature by consuming the electricity and the heat but cannot increase the SOC and the coolant temperature. For this reason, this process is performed in a case where the SOC and the coolant temperature need to be increased. Further, in a case where the SOC and the coolant temperature are too high, this process is performed also in the case of preventing the electricity and the heat from being further generated.

As described above, the driving control process calculates an engine operating point that is the combination of a target engine torque and a target engine rotating speed according to an accelerator pedal operation by the driver, the states of respective components and systems of the vehicle, and the command from the energy management process. At this time, according to the command from the energy management process, that is, by using the prediction results acquired by the heater core model and the electric heating system model performed by the energy management process, a suitable engine operating point is set in consideration of future.

Here, the flow of a series of control processes for setting an engine operating point by making use of the prediction results will be described. A flow chart of engine operating point setting control performed by the vehicle control unit 51 will be shown in FIG. 9. Here, the engine operating point setting control using the prediction results is repeatedly performed in a case where the determination process of the amount of heat for heating that the electric heating system 30 is to supply and the amount of heat for heating that the heater core 20 is to supply is performed. Further, in FIG. 9, a step S3 corresponds to a coolant temperature prediction means, and a step S4 corresponds to a battery state-of-charge prediction means, and a step S5 corresponds to a determination means, and a step S6 corresponds to an engine operating point setting means. In this way, the vehicle control unit 51 of the present embodiment is provided with these function realization means.

In the step S1, a present coolant temperature is read from the coolant temperature sensor 64. Subsequently, in the step S2, a present SOC is read from the MG control unit 53.

Subsequently, in the step S3, a coolant temperature after a given period of time is predicted on the basis of a state in which the heater core 20 consumes the heat. Subsequently, in the step S4, the state of charge of the battery after a given period of time is predicted on the basis of a state in which the electric heating system 30 consumes the electricity.

Here, "on the basis of a state in which the heater core 20 consumes the heat" and "on the basis of a state in which the electric heating system 30 consumes the electricity" mean "on the basis of result of the determination process of the amount of heat for heating that the heater core 20 is to supply" and "on the basis of result of the determination process of the amount of heat for heating that the electric heating system 30 is to supply", respectively.

As described above, in the determination process of the amount of heat for heating that the heater core 20 is to supply and the amount of heat for heating that the electric heating system 30 is to supply, in the case of assuming that the heating performed by using at least one of the electric heating system 30 and the heater core 20 is performed for a given period of time on the basis of an operating point of the present SOC and the present coolant temperature, a target operating point of an SOC and a coolant temperature after the given period of time is determined in such a way that the target operating point is arranged nearest to the target function. Further, the amount of heat for heating that the heater core 20 is to supply and the amount of heat for heating that the electric heating system 30 is to supply are determined in such a way that the SOC and the coolant temperature are arranged at the target operating point after the given period of time and the driving states of the heater core 20 and the electric heating system 30 are controlled. Thus, the position of this target operating point shows the SOC and the coolant temperature after the given period of time, which will be predicted. For this reason, in the steps S3, S4, the SOC and the coolant temperature at the target operating point are determined as the SOC and the coolant temperature after the given period of time.

Subsequently, in the step S5, the shortage or the excess of the amount of heat of the coolant is determined on the basis of the coolant temperature predicted in the step S3 and the short or the excess of the SOC is determined on the basis of the SOC predicted in the step S4. This means the determination made by making use of the map for determination shown in FIG. 8 as described above.

Subsequently, in the step S6, in a case where at least one of the amount of heat and the amount of charge is short or excess in the determination result in the step S5, an engine operating point shifted to a direction in which the shortage or the excess is eliminated is set.

Figure 10:
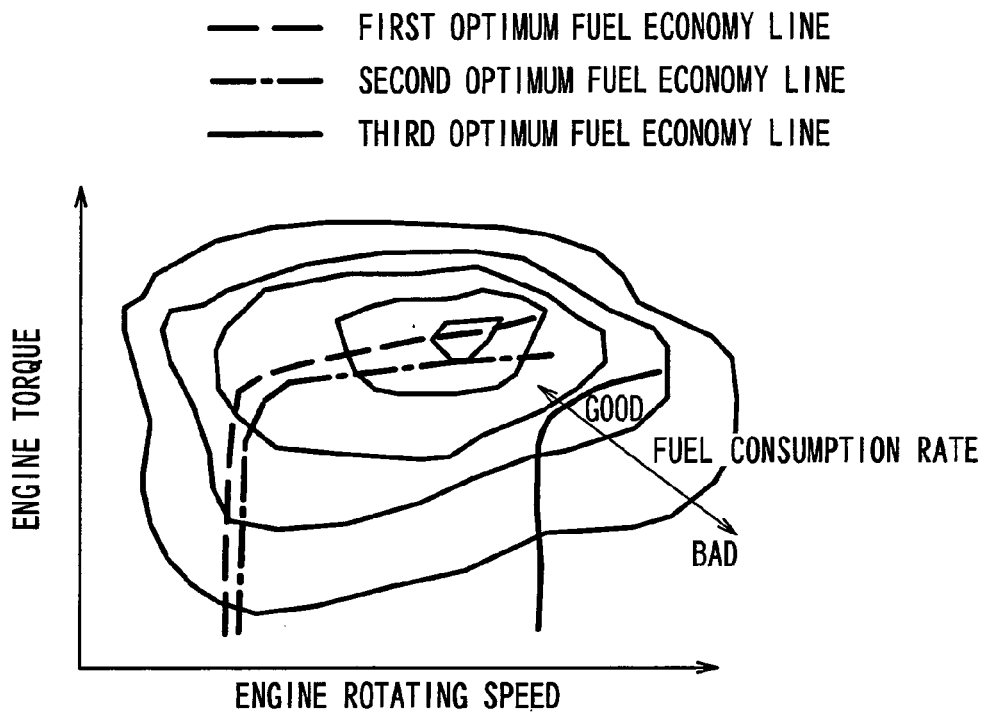
FIG. 10 is an engine operating point map to express a first optimum fuel economy line, a second optimum fuel economy line, and a third optimum fuel economy line as a reference, which are used in the first embodiment.

In FIG. 10 will be shown an engine operating point map in which a first optimum fuel economy line and a second optimum fuel economy line, which are used in the step S6, and a third optimum fuel economy line as a reference are expressed. Further, formulas 1 to 3 for drawing the first to third optimum fuel economy lines shown in FIG. 10 will be described in the following.

Formula 1=fuel consumption[g/h]/shaft output [kW] (Formula 1)

Formula 2=fuel consumption[g/h]/(shaft output [kW]+α×coolant heating heat amount [kW]) (Formula 2)

Formula 3=fuel consumption[g/h]/coolant heating heat amount [kW] (Formula 3)

The first optimum fuel economy line shown in FIG. 10 is a set of points of minimizing the formula 1 on an equi-output power line. That is, the first optimum fuel economy line is a set of engine operating points in which fuel consumption for the shaft output of the engine 10 (optimum line of shaft output) becomes minimal among the engine operating points which are equal to each other in the shaft output of the engine 10.

Figure 11:
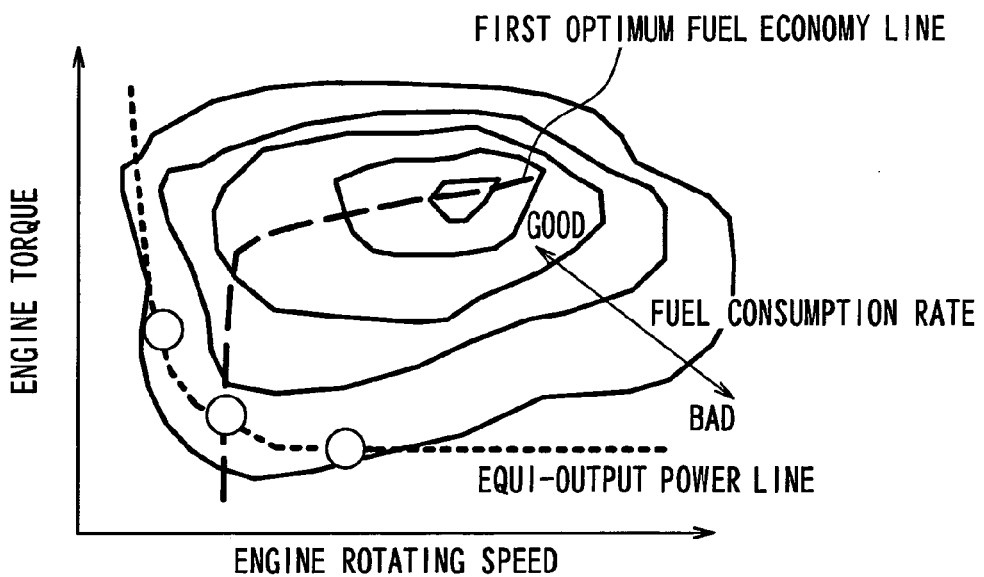
FIG. 11 is an engine operating point map for describing the first optimum fuel economy line shown in FIG. 10.

Here, an engine operating map for describing the first optimum fuel economy line will be shown in FIG. 11. The engine 10 has a fuel consumption rate characteristic shown in FIG. 11, for example, so that the fuel consumption is different for the same shaft output. For this reason, by the combination of the engine 10 and the continuously variable transmission 12, an operating point in which the fuel consumption is small can be set on the equi-output power line, as shown in FIG. 11. A line of connecting the operating points in which the fuel consumption is small on the equi-output power line is called an optimum fuel economy line.

The third optimum fuel economy line shown in FIG. 10 is a set of engine operating points of minimizing the formula 3 on the equi-output power line and is an optimum fuel economy line (coolant heating optimum line) of focusing on an amount of heat for heating the coolant of the engine 10 (heat output). That is, the third optimum fuel economy line is a set of engine operating points in which the fuel consumption becomes minimal for the amount of heat for heating the coolant of the engine 10 among the engine operating points which are equal to each other in the shaft output of the engine 10.

The second optimum fuel economy line shown in FIG. 10 is a set of engine operating points of minimizing the formula 2 on the equi-output power line and is an optimum fuel economy line of focusing on the shaft output and the heat output of the engine 10. That is, the second optimum fuel economy line is a set of engine operating points in which the fuel consumption becomes minimal for the shaft output of the engine 10 and the amount of heat for heating the coolant among the engine operating points which are equal to each other in the shaft output of the engine 10.

Further, the second optimum fuel economy line is a line in which a fuel consumption rate is closer to the first optimum fuel economy line than the third optimum fuel economy line. In formula 2, $\alpha$ is a control element of setting the weight of efficiency relating to a shaft output, which is expressed by the formula 1, and to an amount of heat for heating the coolant, which is expressed by the formula 3. If $\alpha$ is positive, by changing the magnitude of $\alpha$, the position of an optimum line by the engine operating points of minimizing the formula 2 is moved between the first optimum fuel economy line and the third optimum fuel economy line. In the present embodiment, $\alpha$ is determined in such a way that the optimum line by the engine operating points of minimizing the formula 2 is set nearer to the engine operating points on the first optimum fuel economy line of the shaft output than the engine operating points on the third optimum fuel economy line of the amount of heat for heating the coolant. It is for eliminating the following problem: if $\alpha$ is large, that is, the optimum line by the engine operating points of minimizing the formula 2 is closer to the third optimum fuel economy line, the degree of decrease in the efficiency of the shaft output becomes very large, so that as compared with control of setting the engine operating point on the first optimum fuel economy line, there are presented a problem that the fuel consumption in the case of setting an equal shaft output is greatly increased to impair the fuel consumption and that an engine rotating speed is increased to make noise louder to thereby give an occupant a sense of discomfort.

In the step S6, in a case where in the determination using the determination map shown in FIG. 8, it is determined that the coolant temperature is higher than the lower limit of the target temperature range and it is predicted that the heat is not short in a state after a given period of time, the first optimum fuel economy line is selected. On the other hand, in a case where it is determined that the coolant temperature is lower than the lower limit of the target temperature range and it is predicted that the heat is short in the state after the given period of time, the second optimum fuel economy line is selected in which the amount of heat is increased as compared with the first optimum fuel economy line. By selecting the second optimum fuel economy line, as compared with a case where the first optimum fuel economy line is selected, the heat output can be increased and hence the shortage of heat can be quickly eliminated.

Figure 12:
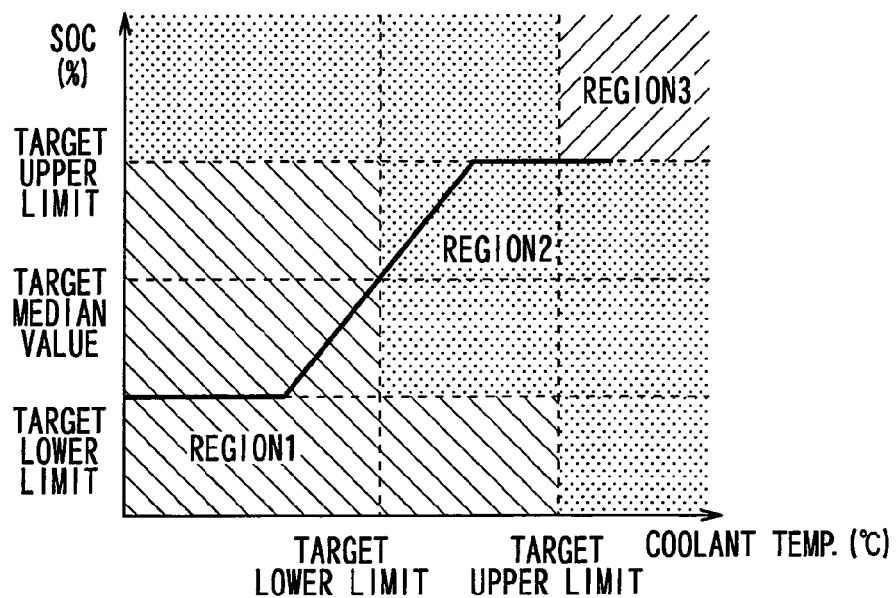
FIG. 12 is a determination map used at the time of selecting an engine operating point based on a state in which heat and electricity are excess or short in the first embodiment.

An engine operating point is selected on the first optimum fuel economy line or the second optimum fuel economy line on the basis of an acceleration/deceleration request of the driver. At this time, the engine operating point to be selected on the first optimum fuel economy line or the second optimum fuel economy line is different according to a state in which the heat and the electricity are short or excess. FIG. 12 shows a determination map used at the time of selecting an engine operating point on the basis of the state in which the heat and the electricity are short or excess. FIG. 12 corresponds to FIG. 8.

As shown in FIG. 12, at the time of a region 2, an ordinary engine operating point is selected on the first optimum fuel economy line or the second optimum fuel economy line. Here, the ordinary engine operating point designates an engine operating point set in a case where neither the heat nor the electricity is excess or short and is hereinafter used in this meaning unless otherwise noted. At the time of a region 1 in which at least one of the heat and the electricity is short and in which neither the heat nor the electricity is excess after a given period of time, an engine operating point is selected which is shifted in a direction in which an engine output is further increased for the ordinary engine operating point. At the time of a region 3 in which both of the heat and the electricity are excess after a given period of time, an engine operating point is selected which is shifted in a direction in which an engine output is further decreased for the ordinary engine operating point. Here, the engine operating point which is shifted in a direction in which an engine output is further decreased includes a state in which the engine is stopped.

Figure 13:
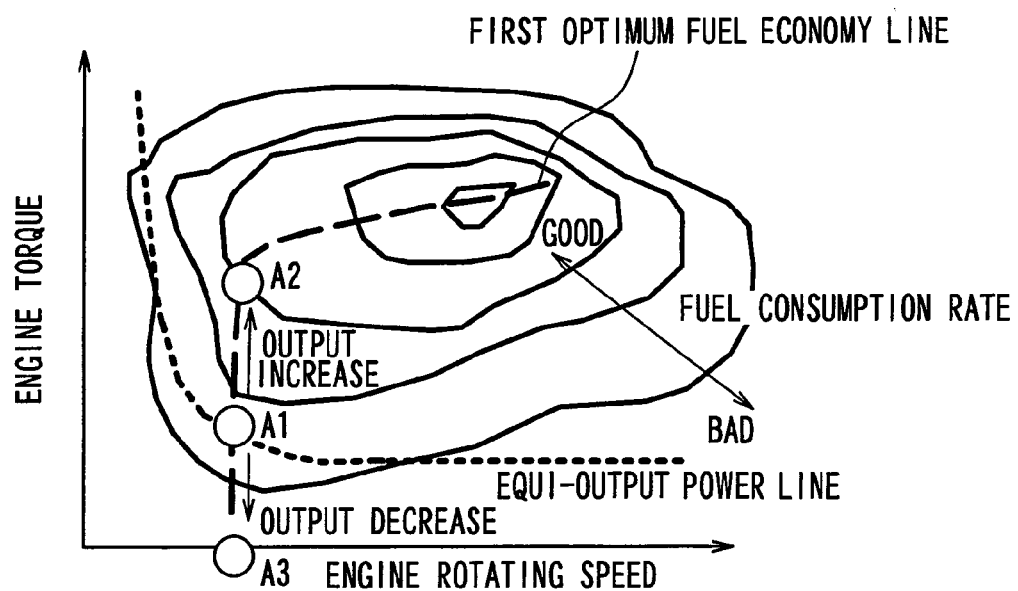
FIG. 13 is a map to show a concept of a method for selecting an engine operating point on the first optimum fuel economy line in the first embodiment.

FIG. 13 shows the concept of a method of selecting an engine operating point on the first optimum fuel economy line. As shown in FIG. 13, in a case where the SOC of the battery 14 is low and the electricity needs to be generated, an engine operating point A2 in which an output is larger than the ordinary engine operating point A1 is set and a difference between the shaft output of the engine and the driving force necessary for driving the vehicle is used for making the motor generator 11 generate the electricity.

On the other hand, in a case where the SOC of the battery 14 is high and the battery 14 needs to discharge the electricity, an engine operating point A3 in which an output is smaller than the ordinary engine operating point A1 is set to thereby consume the electricity by driving the vehicle by means of the motor. The selection of an engine operating point on the second optimum fuel economy line is also performed in the same way.

The selection of the engine operating point on either of the first optimum fuel economy line or the second optimum fuel economy line can be realized by making use of a map using the first optimum fuel economy line and a map using the second optimum fuel economy line. The map using the first optimum fuel economy line includes: a map for selecting an ordinary engine operating point; a map for selecting an engine operating point in which an output is increased more than the ordinary engine operating point; and a map for selecting an engine operating point in which an output is decreased more than the ordinary engine operating point. On the other hand, the map using the second optimum fuel economy line includes: a map for selecting an ordinary engine operating point; and a map for selecting an engine operating point in which an output is increased more than the ordinary engine operating point.

Specifically, in a case where the position of a target engine operating point of the engine coolant is higher than a target lower limit of the engine coolant, and further: 1) in a case where the position of the target engine operating point belongs to the region 2 shown in FIG. 12, the ordinary map for selecting an engine operating point on the first optimum fuel economy line is used; 2) in a case where the position of the target engine operating point belongs to the region 1 shown in FIG. 12, the map for selecting an engine operating point which is located on the first optimum fuel economy line and in which an output is increased more than the ordinary engine operating point is used; and 3) in a case where the position of the target engine operating point belongs to the region 3 shown in FIG. 12, the map for selecting an engine operating point which is located on the first optimum fuel economy line and in which an output is decreased more than the ordinary engine operating point is used.

On the other hand, in a case where the position of the target engine operating point of the engine coolant is lower than the target lower limit of the engine coolant, and further: in a case where the position of the target engine operating point belongs to the region 2 shown in FIG. 12, the ordinary map for selecting an engine operating point on the second optimum fuel economy line is used; and in a case where the position of the target engine operating point belongs to the region 1 shown in FIG. 12, the map for selecting an engine operating point which is located on the second optimum fuel economy line and in which an output is increased more than the ordinary engine operating point is used.

In the examples shown in FIG. 5 and FIG. 6, the target engine operating point P4 is lower than the target lower limit of the engine coolant and belongs to the region 1 shown in FIG. 12, so that the map for selecting an engine operating point which is located on the second optimum fuel economy line and in which an output is increased more than the ordinary engine operating point is used.

In this way, if the engine operating point is set in step S6, the vehicle control unit 51 outputs the set engine operating point. The engine control unit 52 activates the engine 10 at the set engine operating point.

As described above, in the present embodiment, in a case where the engine 10 is in an operating state and the coolant temperature is lower than a specified temperature at the time of setting a heating operation, on the assumption that the heating operation using at least one of the electric heating system 30 and the heater core 20 is performed for a given period of time, a distribution of the amount of heat for heating that the heater core 20 is to supply and the amount of heat for heating that the electric heating system 30 is to supply is set in such a way that an operating point of the SOC and the coolant temperature after a given prediction period becomes an operating point nearest to the target function shown in FIG. 3. When the heating operation using at least one of the heater core 20 and the electric heating system 30 is performed, the amount of heat for heating that the heater core 20 is to supply and the amount of heat for heating that the electric heating system 30 is to supply are controlled on the basis of this setting and the amount of heat of the engine coolant and the electricity of the battery are consumed, whereby a balance between the state of charge of the battery and the coolant temperature is controlled.

The target function shown in FIG. 3, as described above, is the straight line passing the median value of the target SOC range and the lower limit of the target coolant temperature and having a predetermined gradient a1. The gradient a1 is equal to a gradient of an approximate straight line when the relationship between the coolant temperature and the SOC in a case where an engine operating point on the first optimum fuel economy line is selected is expressed on the coordinate axes.

For this reason, in a case where the state of charge of the battery and the coolant temperature which are brought into balance is not within a target range, by selecting an engine operating point on the first optimum fuel economy line or on the second optimum fuel economy line near to the first optimum fuel economy line, the state of charge of the battery and the coolant temperature can be brought near to a specified value within a target battery charge state range (target range of the state of charge of the battery) and to the lower limit of the target coolant temperature range (target range of coolant temperature), respectively.

Figure 9:
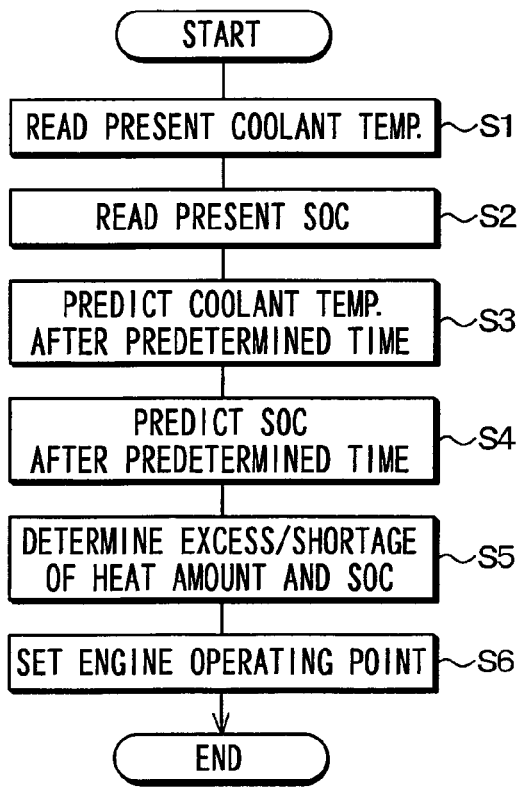
FIG. 9 is a flow chart of engine operating point setting control performed by a vehicle control unit 51 in the first embodiment.

Further, in the present embodiment, in the setting of the engine operating point, as described in the step S6 shown in FIG. 9, in a case where the amount of heat is not short in the determination result in the step S5, the engine operating point on the first optimum fuel economy line is selected, whereas in a case where the amount of heat is short in the determination result in the step S5, the engine operating point is selected which is located on the second optimum fuel economy line shifted in the direction in which the amount of heat for heating the coolant is increased as compared with the first optimum fuel economy line.

Further, in a case where at least one of the amount of heat and the SOC is short in the determination result in the step S5 and where neither the amount of heat nor the SOC is excess in the determination result in the step S5, the engine operating point is selected which is shifted to a direction in which the engine output is increased for the ordinary engine operating point on the selected first or second optimum fuel economy line. Still further, in a case where both of the amount of heat and the SOC are excess in the determination result in the step S5, the engine operating point is selected which is shifted to a direction in which the engine output is decreased for the ordinary engine operating point.

In this way, in a case where the amount of heat of the coolant and the amount of charge of the battery 41 are predicted to be short or excess, by shifting the engine operating point in a direction to eliminate the shortage or the excess, the amount of heat and the amount of charge are increased or decreased before the amount of heat of the coolant and the amount of charge of the battery 41 become short or excess, so that it is possible to prevent the amount of heat of the coolant and the amount of charge of the battery 41 from becoming short or excess. That is, as compared with a case where the shortage or the excess of the amount of heat of the coolant and the amount of charge of the battery 41 is not predicted, it is possible to reduce the frequency at which the amount of heat of the coolant and the amount of charge of the battery 41 become short or excess.

As a result, as compared with the case where the shortage or the excess of the amount of heat of the coolant and the amount of charge of the battery 41 is not predicted, it is possible to increase a chance to set the engine operating point on the first optimum fuel economy line and hence to prevent an increase in the fuel consumption.

In addition, in a case where the amount of heat is predicted to be short, the engine operating point is set not on the first optimum fuel economy line but on the second optimum fuel economy line, and the second optimum fuel economy line, as shown in FIG. 10, has a fuel consumption rate closer to the first optimum fuel economy line than the third optimum fuel economy line, so that an increase in the fuel consumption caused by changing an operation line can be reduced to a minimum level.

Second Embodiment

A heat load and an electricity load mounted in a hybrid vehicle include: loads like the heater core 20 and the electric heating system 20 in which an amount of heat consumed and an amount of electricity consumed can be adjusted by control, as described in the first embodiment; and loads like a battery warming-up unit and electric power steering in which the amount of heat consumed and the amount of electricity consumed cannot be adjusted by the control.

The present embodiment will describe a method for predicting a coolant temperature and a state of charge of a battery after a given period of time on the basis of a state of heat consumption and a state of electricity consumption in the loads in which the amount of heat consumed and the amount of electricity consumed cannot be controlled. Points different from those of the first embodiment will be described in the following. An example of setting of a predicted operating point of an SOC and a coolant temperature will be shown in FIG. 14.

Figure 14:
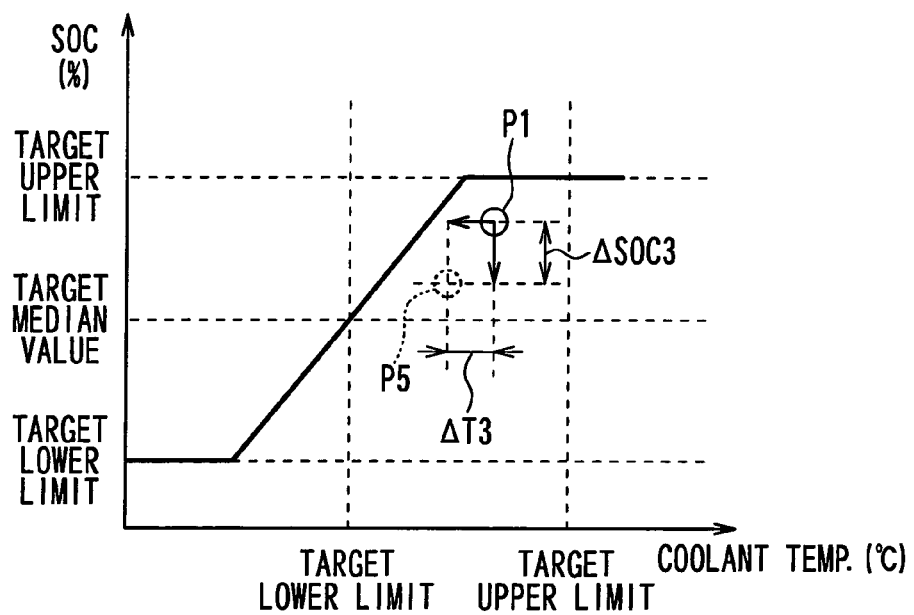
FIG. 14 is a graph to show an example of setting a predicted operating point of an SOC and a coolant temperature in a second embodiment.

In the present embodiment, in step S3 and S4 shown in FIG. 6, as shown in FIG. 14, the amount of decrease $\Delta T3$ in the coolant temperature and the amount of decrease $\Delta SOC3$ in the SOC after a given period of time, which are respectively caused by the heat load and the electricity load, are predicted for the present operating point P1 of the coolant temperature and the SOC, and a predicted operating point P5 is set on the basis of them.

Here, in the setting of a predicted operating point in a case where the heat load is a battery warming-up unit, an amount of heat consumed $\Delta T3$ within the given period of time is calculated by making use of the present battery temperature and the amount of heat consumed for warming-up a battery which is previously set according to various battery temperatures. The calculated amount of heat consumed is a predicted amount of decrease $\Delta T3$ in the coolant temperature which is caused by heat consumption by the heat load shown in FIG. 14.

On the other hand, in the setting of a predicted operating point in a case where the electricity load is the electric power steering, an average amount of electricity consumed is calculated on the basis of a past operation in the electric power steering control unit (not shown). If the electric power steering is being operated, an amount of electricity consumed in a given period of time is calculated on the basis of the average amount of electricity consumed. Here, since it is an object to reflect information such that the amount of electricity consumed is an extremely small amount as compared with the heating or a level not to be neglected as compared with the heating, as the amount of electricity consumed is used, for example, not an amount of electricity consumed in an operating state momentarily changed of the electric power steering but an average amount of electricity consumed which is slowly changed. The amount of electricity consumed which is calculated in this way is the amount of decrease $\Delta SOC3$ in the SOC, which is caused by the electricity consumption of the electricity load shown in FIG. 14.

Thereafter, as in the case of the first embodiment, the processes after step S5 are performed.

In the way described above, the coolant temperature and the state of charge of the battery after the given period of time can be also predicted.

Other Embodiments (1) In the first embodiment, as shown in FIG. 3, the target function is made a straight line having a predetermined gradient a1 and the predetermined gradient a1 is made equal to a gradient of an approximate straight line expressing changes in the coolant temperature and in the SOC in a case where an engine operating point on the first optimum fuel economy line is selected. However, the predetermined gradient may be made a change rate of an approximate line expressing changes in the coolant temperature and in the SOC in a case where an engine operating point on the first optimum fuel economy line is selected.

That is, in a case where the approximate line is not a straight line having a constant gradient but is expressed by a plurality of straight lines having different gradients, the different gradients may be used as the predetermined gradients. For example, the straight line having the predetermined gradient may be a straight line having a gradient a1 in a range in which temperature is lower than a given temperature and having a gradient a2 in a range in which the temperature is higher than the given temperature. Further, in a case where the approximate line is expressed by an approximate curved line, the straight line having the predetermined gradient may be a curved line having the same change rate as the approximate curved line.

(2) Further, in the first embodiment, as shown in FIG. 3, the target function is made the straight line passing the median value of the target SOC range and the lower limit of the target coolant temperature range. However, the straight line may pass not the median value of the target SOC range but a given value within the target SOC range. Similarly, the straight line may pass not the lower limit of the target coolant temperature range but a given value within the target coolant temperature range.

(3) In the first embodiment, the heat pump system 30 is employed as the electric heating system. However, in place of the heat pump system 30, a PTC heater can be employed. The PTC heater is an electric heater having a PTC element (positive temperature coefficient thermistor) and generating heat when electricity is supplied to the PTC element.

(4) In the first embodiment, the vehicle control unit 51 sets the amount of heat for heating that the heater core 20 is to supply and the amount of heat for heating that the electric heating system 30 is to supply, and the air conditioning control unit 54 controls the amount of heat for heating that the heater core 20 is to supply and the amount of heat for heating that the electric heating system 30 is to supply. However, other control units may perform this setting and control.

In addition, in the first embodiment, the vehicle control unit 51 performs the respective steps shown in FIG. 9, but other unit may perform the respective steps shown in FIG. 9.

(5) In the first embodiment, at the time of setting the engine operating point, in a case where the position of the target operating point of the SOC and the engine coolant temperature after a given period of time is a position in which the heat is short, the second optimum fuel economy line is selected. However, in a case where the position of the target operating point of the SOC and the engine coolant temperature after the given period of time is a position in which the heat is short and the electricity is adequate, the second optimum fuel economy line may be selected and in the other cases, the first optimum fuel economy line may be selected. This is because by selecting the second optimum fuel economy line, an increase in the electricity can be reduced and a heat output can be increased as compared with a case of selecting the first optimum fuel economy line.

(6) The respective embodiments described above may be combined with each other within a feasible range.

To sum up, the control device for a hybrid vehicle of the above embodiments can be described as follows.

The control device is for a hybrid vehicle. The hybrid vehicle includes an engine 10, a battery 41, a motor generator 11, a heat load 20, and an electricity load 30. The engine 10 is configured to output driving force for driving the vehicle and driving force for generating electricity. The battery 41 is charged with electricity and discharges electricity. The motor generator 11 is capable of outputting driving force for driving the vehicle by the electricity discharged from the battery 41 and is capable of generating electricity by the driving force outputted from the engine 10 to supply the battery 41 with electricity. The heat load 20 is configured to consume heat of coolant of the engine 10. The electricity load 30 is configured to consume the electricity of the battery 41. The control device is disposed in the hybrid vehicle and includes an engine operating point setting means 51, S6, a coolant temperature prediction means 51, S3, a battery state-of-charge prediction means 51, S4, and a determination means 51, S5. The engine operating point setting means 51, S6 is for setting an engine operating point when the engine 10 is operated. The coolant temperature prediction means 51, S3 is for predicting coolant temperature after a predetermined period of time based on a state in which the heat load 20 consumes the heat. The battery state-of-charge prediction means 51, S4 is for predicting a state of charge of the battery 41 after the predetermined period of time based on a state in which the electricity load 30 consumes the electricity. The determination means 51, S5 is for determining whether an amount of heat of coolant is short or excess based on the coolant temperature predicted by the coolant temperature prediction means 51, S3 and is for determining whether an amount of charge of the battery 41 is short or excess based on the state of charge of the battery 41 predicted by the battery state-of-charge prediction means 51, S4. When at least one of the amount of heat and the amount of charge is short or excess as a result of the determination by the determination means 51, S5, the engine operating point setting means 51, S6 sets the engine operating point, which is shifted in a direction to eliminate the shortage or the excess of the at least one of the amount of heat and the amount of charge.

Accordingly, in a case where it is predicted that the amount of heat and the amount of charge are short or excess, the engine operating point is shifted in the direction in which the shortage or the excess is eliminated, whereby the amount of heat and the amount of charge are increased or decreased before the amount of heat and the amount of charge becomes short or excess to thereby prevent the amount of heat and the amount of charge from becoming short or excess. That is, as compared with a case where it is not predicted that the amount of heat and the amount of charge are short or excess, the frequency can be reduced at which the amount of heat and the amount of charge actually become short or excess.

As a result, as compared with the case where it is not predicted that the amount of heat and the amount of charge are short or excess, it is possible to increase a chance to set the engine operating point on the engine optimum fuel economy line and hence to prevent an increase in the fuel consumption.

The engine operating point setting means 51, S6 has a first optimum fuel economy line and a second optimum fuel economy line. The first optimum fuel economy line indicates a set of engine operating points at which fuel consumption is minimal relative to shaft output of the engine 10 among engine operating points having the same shaft output of the engine 10. The second optimum fuel economy line indicates a set of engine operating points at which the fuel consumption is minimal relative to the shaft output of the engine 10 and a coolant heating heat amount among the engine operating points having the same shaft output of the engine 10. The coolant heating heat amount is an amount of heat with which the engine 10 heats coolant. The second optimum fuel economy line is arranged closer to the set of engine operating points on the first optimum fuel economy line than a third optimum fuel economy line that indicates a set of engine operating points at which the fuel consumption is minimal relative to the coolant heating heat amount of the engine 10 among the engine operating points having the same shaft output of the engine 10. When the determination means 51, S5 determines that the amount of heat of coolant is not short, the engine operating point setting means 51, S6 selects one of the set of engine operating points on the first optimum fuel economy line. When the determination means 51, S5 determines that the amount of heat of coolant is short, the engine operating point setting means 51, S6 selects one of the set of engine operating points on the second optimum fuel economy line, which is shifted from the first optimum fuel economy line in a direction in which the coolant heating heat amount increases.

In this case where it is predicted that the amount of heat is short, an increase in the fuel consumption caused by changing an operation line can be reduced to a minimum by employing the second optimum fuel economy line which is highly-efficient from both points of view of the shaft output and the amount of heat for heating the coolant.

When at least one of the amount of heat and the amount of charge is short and neither the amount of heat nor the amount of charge is excess as a result of the determination by the determination means 51, S5, the engine operating point setting means 51, S6 selects the engine operating point that is shifted from the engine operating point at which neither the amount of heat nor the amount of charge is short or excess, in a direction in which the output of the engine 10 increases. When both of the amount of heat and the amount of charge are excess as a result of the determination by the determination means 51, S5, the engine operating point setting means 51, S6 selects the engine operating point that is shifted from the engine operating point at which neither the amount of heat nor the amount of charge is short or excess, in a direction in which the output of the engine 10 decreases.

The heat load 20 is a heater core 20 configured to supply an interior of a compartment of the vehicle with heat for heating which is taken out of the coolant of the engine 10. The electricity load 30 is an electric heating system 30 configured to supply the interior of the compartment of the vehicle with heat for heating by making use of the electricity supplied from the battery 41. When vehicle heating is in operation and the coolant temperature is lower than a predetermined temperature, on an assumption that the vehicle heating using at least one of the electric heating system 30 and the heater core 20 is performed for the predetermined period of time, an amount of heat for heating supplied by the electric heating system 30 and the heater core 20 is set in such a way that the state of charge of the battery 41 and the coolant temperature are arranged at a predetermined engine operating point after the predetermined period of time. When expressed on a coordinate system having the state of charge of the battery 41 and the coolant temperature as its coordinate axes, the predetermined operating point is an operating point for the state of charge of the battery 41 and the coolant temperature, which is the closest to a line that passes through a predetermined value in a target range of the state of charge of the battery 41 and a predetermined value in a target range of the coolant temperature and that has a preset change rate, and which is settable within the predetermined period of time. The change rate is the same as a gradient of an approximate line that indicates changes of the state of charge of the battery 41 and the coolant temperature in a case of selection of any one of a set of engine operating points at which fuel consumption is minimal relative to shaft output of the engine 10 among engine operating points having the same shaft output of the engine 10 while the vehicle is traveling in a traveling pattern that is preset as a low-load drive of the vehicle including a travel stop of the vehicle when the vehicle heating is stopped. The coolant temperature prediction means 51, S3 and the battery state-of-charge prediction means 51, S4 predict the coolant temperature and the state of charge of the battery 41 after the predetermined period of time based on the set amount of heat for heating supplied by the electric heating system 30 and the heater core 20.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for a hybrid vehicle including:
   an engine that is configured to output driving force for driving the vehicle and driving force for generating electricity;
   a battery that is charged with electricity and discharges electricity;
   a motor generator that is capable of outputting driving force for driving the vehicle by the electricity discharged from the battery and is capable of generating electricity by the driving force outputted from the engine to supply the battery with electricity;
   a heat load that is configured to consume heat of coolant of the engine; and
   an electricity load that is configured to consume the electricity of the battery, the control device disposed in the hybrid vehicle and comprising:
   an engine operating point setting means for setting an engine operating point when the engine is operated;
   a coolant temperature prediction means for predicting coolant temperature after a predetermined period of time based on a state in which the heat load consumes the heat;
   a battery state-of-charge prediction means for predicting a state of charge of the battery after the predetermined period of time based on a state in which the electricity load consumes the electricity; and
   a determination means for determining whether an amount of heat of coolant is short or excess based on the coolant temperature predicted by the coolant temperature prediction means and for determining whether an amount of charge of the battery is short or excess based on the state of charge of the battery predicted by the battery state-of-charge prediction means, wherein when at least one of the amount of heat and the amount of charge is short or excess as a result of the determination by the determination means, the engine operating point setting means sets the engine operating point, which is shifted in a direction to eliminate the shortage or the excess of the at least one of the amount of heat and the amount of charge.

2. The control device according to claim 1, wherein:
   the engine operating point setting means has:
   a first optimum fuel economy line that indicates a set of engine operating points at which fuel consumption is minimal relative to shaft output of the engine among engine operating points having the same shaft output of the engine; and
   a second optimum fuel economy line that indicates a set of engine operating points at which the fuel consumption is minimal relative to the shaft output of the engine and a coolant heating heat amount among the engine operating points having the same shaft output of the engine, the coolant heating heat amount being an amount of heat with which the engine heats coolant;
   the second optimum fuel economy line is arranged closer to the set of engine operating points on the first optimum fuel economy line than a third optimum fuel economy line that indicates a set of engine operating points at which the fuel consumption is minimal relative to the coolant heating heat amount of the engine among the engine operating points having the same shaft output of the engine;
   when the determination means determines that the amount of heat of coolant is not short, the engine operating point setting means selects one of the set of engine operating points on the first optimum fuel economy line; and
   when the determination means determines that the amount of heat of coolant is short, the engine operating point setting means selects one of the set of engine operating points on the second optimum fuel economy line, which is shifted from the first optimum fuel economy line in a direction in which the coolant heating heat amount increases.

3. The control device according to claim 1, wherein:
   when at least one of the amount of heat and the amount of charge is short and neither the amount of heat nor the amount of charge is excess as a result of the determination by the determination means, the engine operating point setting means selects the engine operating point that is shifted from the engine operating point at which neither the amount of heat nor the amount of charge is short or excess, in a direction in which the output of the engine increases; and
   when both of the amount of heat and the amount of charge are excess as a result of the determination by the determination means, the engine operating point setting means selects the engine operating point that is shifted from the engine operating point at which neither the amount of heat nor the amount of charge is short or excess, in a direction in which the output of the engine decreases.

4. The control device according to claim 1, wherein:
   the heat load is a heater core configured to supply an interior of a compartment of the vehicle with heat for heating which is taken out of the coolant of the engine;
   the electricity load is an electric heating system configured to supply the interior of the compartment of the vehicle with heat for heating by making use of the electricity supplied from the battery;
   when vehicle heating is in operation and the coolant temperature is lower than a predetermined temperature, on an assumption that the vehicle heating using at least one of the electric heating system and the heater core is performed for the predetermined period of time, an amount of heat for heating supplied by the electric heating system and the heater core is set in such a way that the state of charge of the battery and the coolant temperature are arranged at a predetermined operating point after the predetermined period of time;
   when expressed on a coordinate system having the state of charge of the battery and the coolant temperature as its coordinate axes, the predetermined operating point is an operating point for the state of charge of the battery and the coolant temperature, which is the closest to a line that passes through a predetermined value in a target range of the state of charge of the battery and a predetermined value in a target range of the coolant temperature and that has a preset change rate, and which is settable within the predetermined period of time;

the change rate is the same as a gradient of an approximate line that indicates changes of the state of charge of the battery and the coolant temperature in a case of selection of any one of a set of engine operating points at which fuel consumption is minimal relative to shaft output of the engine among engine operating points having the same shaft output of the engine while the vehicle is traveling in a traveling pattern that is preset as a low-load drive of the vehicle including a travel stop of the vehicle when the vehicle heating is stopped; and the coolant temperature prediction means and the battery state-of-charge prediction means predict the coolant temperature and the state of charge of the battery after the predetermined period of time based on the set amount of heat for heating supplied by the electric heating system and the heater core.

\* \* \* \* \*